(12) United States Patent
Böttger

(10) Patent No.: US 12,415,655 B2
(45) Date of Patent: Sep. 16, 2025

(54) CONTAINER WITH A REUSABLE CAP

(71) Applicant: Bettina Böttger, Estoril (PT)

(72) Inventor: Bettina Böttger, Estoril (PT)

( * ) Notice: Subject to any disclaimer, the term of this patent is extended or adjusted under 35 U.S.C. 154(b) by 51 days.

(21) Appl. No.: 17/915,891

(22) PCT Filed: Mar. 29, 2021

(86) PCT No.: PCT/EP2021/058156
§ 371 (c)(1),
(2) Date: Sep. 29, 2022

(87) PCT Pub. No.: WO2021/198179
PCT Pub. Date: Oct. 7, 2021

(65) Prior Publication Data
US 2023/0146200 A1    May 11, 2023

(30) Foreign Application Priority Data

Mar. 31, 2020  (EP) .................................... 20382253
Apr. 15, 2020  (EP) .................................... 20382295

(51) Int. Cl.
| | | |
|---|---|---|
| B65D 41/04 | (2006.01) | |
| B65D 51/14 | (2006.01) | |
| B65D 53/02 | (2006.01) | |
| B65D 79/00 | (2006.01) | |

(52) U.S. Cl.
CPC ..... B65D 41/0442 (2013.01); B65D 41/0492 (2013.01); B65D 51/145 (2013.01); B65D 53/02 (2013.01); B65D 79/0087 (2020.05)

(58) Field of Classification Search
CPC ............ B65D 41/0442; B65D 41/0492; B65D 51/145; B65D 53/02; B65D 79/0087; Y02W 30/80
See application file for complete search history.

(56) References Cited

U.S. PATENT DOCUMENTS

| | | | | |
|---|---|---|---|---|
| 402,614 | A * | 5/1889 | Reeves ................ | B65D 51/145 215/276 |
| 1,132,975 | A * | 3/1915 | Robertson .......... | B65D 41/0492 215/323 |
| 1,425,594 | A * | 8/1922 | Keeran ................ | B65D 51/145 215/276 |
| 1,877,258 | A * | 9/1932 | Spahn ................ | B65D 41/0442 215/277 |
| 3,307,728 | A * | 3/1967 | Elser .................... | B65D 51/145 215/276 |
| 3,445,023 | A * | 5/1969 | Giessler .............. | B65D 51/145 215/276 |

\* cited by examiner

*Primary Examiner* — James N Smalley
(74) *Attorney, Agent, or Firm* — Eugenio J. Torres-Oyola; Victor M. Rodriguez-Reyes; Rafael Rodriguez-Muriel

(57) ABSTRACT

A container with a reusable cap, including a glass receptacle (10) with a receptacle opening (11) surrounded by an annular mouth (12) and by a cylindrical neck (13) including a retention configuration; a cap (20) including a closing portion (30) completely covering the receptacle opening (11) and an engagement portion (40) made of a metal sheet; a releasable closure mechanism connecting the engagement portion (40) with the retention configurations and a sealing ring (50), the engagement portion including radial protrusions (41), directed inwards and determining a local narrowing, the sealing ring (50) being not adhered to the cap and being retained within the cap (20).

20 Claims, 9 Drawing Sheets

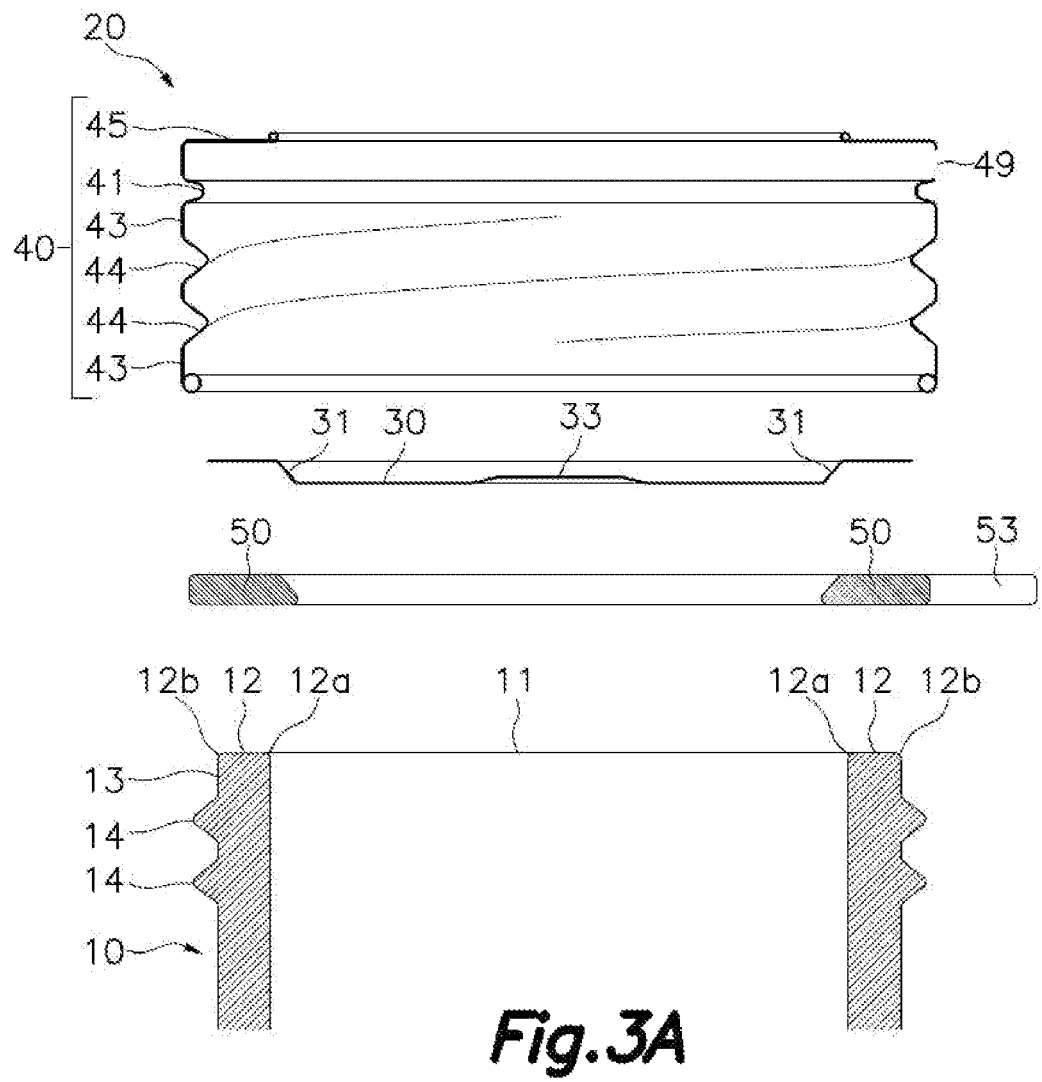
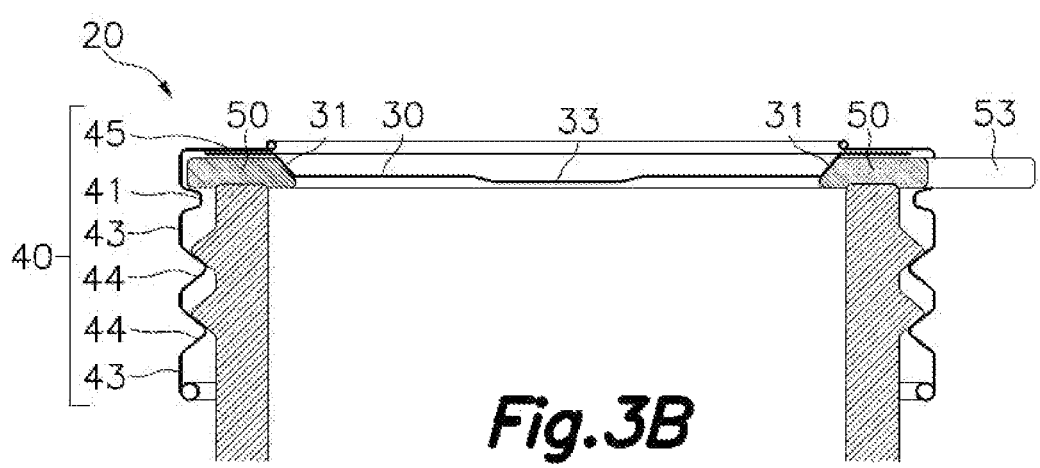

CONTAINER WITH A REUSABLE CAP

TECHNICAL FIELD

The present invention is directed to a container, for example a vacuum, gas and liquid tight container, with a reusable cap. The container can be used for storage and, when it is a vacuum tight container, it can maintain an inner gas pressure lower than the ambient air without collapsing, which is appropriate mainly for food conservation and storage.

The cap, in order to be reusable, is made of a durable and oxide-resistant material and include a releasable sealing ring allowing for cleaning operations.

State of the Art

Document U.S. Pat. No. 3,307,728 describes a container with a cap made of a folded metal sheet, said cap comprising a closing portion for completely covering the receptacle opening, and an independent engagement portion to provide engagement between the cap and the receptacle producing a compression force on the closing portion towards the annular mouth.

In this solution the sealing ring is not adhered but mounted in an annular groove defined in the periphery of the closing portion.

Document U.S. Pat. No. 3,219,223 describes a container similar to the previously described solution in which the closing portion includes a sealing ring molded in, and therefore adhered to, the closing portion. The adherence of the sealing ring to the closing portion is further increased by the periphery of the sealing ring being inserted in an annular groove defined in the periphery of the closing portion.

On the previous documents U.S. Pat. Nos. 3,307,728 and 3,219,223 the cap is made of a weak material, such aluminum, selected to be deformed by pressing the engagement portion thereof against the thread of the receptacle, causing the deformation of the cap which adopts the shape of the thread of the receptacle against which it is pressed. Therefore, because it is made of a deformable material, said engagement portion could be easily deformed or bended accidentally during manipulation operations, reducing the reusability of the cap.

Also, on both documents, the closing portion is retained into the engagement portion, preventing proper cleaning operations.

Furthermore, the tinplate and other metals shall be varnished or painted to prevent oxidation and to permit the adhesion of the sealing ring thereon, and this varnish or paint enters in contact with the food or beverage stored in the container. As well these materials and their applications makes it unlikely to be reused due to potential interferences of the varnish in utilization.

Those and other problems are solved by the present patent application.

BRIEF DESCRIPTION OF THE INVENTION

The present invention proposes, in a manner already known in the state of the art, a vacuum, gas and liquid tight container with a reusable cap including:
- a glass receptacle provided with a receptacle opening surrounded by a cylindrical neck including retention configurations on a cylindrical outer surface thereof, said cylindrical neck defining an annular mouth surrounding the receptacle opening;
- a cap including a closing portion completely covering the receptacle opening and an engagement portion made of metal sheet and including a cylindrical segment with an inner diameter surrounding the cylindrical neck,
- a releasable closure mechanism connecting the engagement portion with the retention configurations to provide engagement between the cap and the glass receptacle producing a compression force on the closing portion towards the annular mouth when the cap is in an attached position; and
- a sealing ring with an outer diameter equal to or smaller than the inner diameter of the cylindrical segment and compressed between the annular mouth and the closure portion providing a tight seal;

According to that the proposed container comprises a glass receptacle with a receptacle opening and a reusable cap to seal said receptacle opening with a closing portion of said cap.

The receptacle opening is surrounded by an annular mouth defined on an end border of a cylindrical neck made of the glass constitutive of the glass receptacle. A cylindrical outer surface of the cylindrical neck includes a retention configuration also made of the glass constitutive of the glass receptacle.

Said retention configuration can be, for example, a thread, housings on opposed sides of the cylindrical neck, an annular recess or an annular collar.

The cap can be attached or released from the glass receptacle by a releasable closure mechanism configured engaging the cap with the retention configurations of the glass receptacle in a releasable manner.

According to one embodiment, the releasable closure mechanism comprises engagement configurations, included in an engagement portion of the cap, which are complementary to a thread of the cylindrical neck, constitutive of the retention configurations. Said engagement configurations are defined by local deformations or folds of the metal sheet constitutive of the engagement portion of the cap.

Alternatively, the retention configurations of the cylindrical neck can be defined by a thread surrounding said cylindrical neck and the releasable closure mechanism can be a threaded ring, independent from the cap, surrounding the cylindrical segment and including engagement configurations complementary to the thread, said threaded ring further including a ring mouth segment overlapped to a perimeter area of the closing portion, retaining said closing portion against the annular mouth of the glass receptacle.

The releasable closure mechanism can also be defined by several clip members each connecting, under elastic stress, the retention configurations of the cylindrical neck with the cap when the cap is in closed position.

According to an alternative embodiment, the releasable closure mechanism comprises a shaped metal wire defining a first region configured for being connected to the cap, at least when in the closed position; a second region configured for being attached to the glass receptacle; and a third region connected to the second region and configured for being movable between a first position, in which the third region is connected to the first region under elastic stress, attracting the first region to the annular mouth of the glass receptacle, and a second position in which the third region is free of elastic stress and the first region is spaced apart from the annular mouth of the glass receptacle or is released from the third region.

The first region can be connected to the cap by its insertion in one or multiple depressions of the cylindrical segment defined in an outer back side of the one or multiple radial protrusions of the cylindrical segment. The radial protrusions are defined by a local bending of the metal sheet constitutive of the engagement portion of the cap, said local bending defining simultaneously the radial protrusions and depressions in the outer side of the engagement portion, where the first region can be housed.

The second region can be connected to the retention configurations of the glass receptacle by surrounding the cylindrical neck, preferably being inserted in a groove of said cylindrical neck or retained by an annular protrusion surrounding said cylindrical neck.

Preferably, the first region and the second region are connected to each other in an articulated manner in a first side of the cylindrical neck of the glass receptacle, and the third region is connected in an articulated manner to the second region in a second side of the cylindrical neck opposed to the first side, the connection between the first and third regions being configured to be releasable when in the open position.

Alternatively, the second region and the third region are connected to each other, and the first region is connected to the third region in an articulated manner, being configured to remain connected to the third region in both the closed and the open positions.

When the releasable closure mechanism is connected to the retention configurations of the cylindrical neck a compression force is produced pushing the closing portion towards the annular mouth of the glass receptacle, compressing a sealing ring in between. The sealing ring can be made of a suitable air-tight elastic or deformable material, such thermoplastic, plastic, rubber, silicone, cork or others.

The present invention further proposes the following features which are not known from the available prior art:
- the closing portion and the engagement portion of the cap are independent to each other, and the engagement portion further comprises a ring mouth segment overlapped to a perimeter area of the closing portion, retaining said closing portion between the ring mouth segment and the sealing ring;
- the cylindrical segment includes one or multiple radial protrusions, directed inwards, defined by local deformations of the metal sheet and placed at a distance from the closing portion, said radial protrusions determining a local narrowing of the inner diameter of the cylindrical segment, the sealing ring being retained within the cap when the cap is in a detached position from the glass receptacle by having an outer diameter bigger than the local narrowing; and
- the sealing ring is not adhered to the cap.

The one or multiple radial protrusions of the cylindrical segment can be one or multiple tapered surfaces determining an inner diameter of the cylindrical segment that increases as the distance from the closing portion decreases, retaining the sealing ring.

According to a preferred embodiment, the closing portion includes an inner annular protrusion, which is concentric with the cylindrical segment and protrudes towards the receptacle opening, the sealing ring being compressed between the annular mouth and the inner annular protrusion and being retained in a centered position between said inner annular protrusion and the inner diameter of the cylindrical segment.

According to that, the closing portion includes an inner annular protrusion. It will be understood that said inner annular protrusion is a continuous protrusion with a circular shape and concentric with the cylindrical segment and therefore also concentric with the annular mouth of the glass receptacle when the cap is attached thereto.

Said inner annular protrusion protrudes from the closing portion towards the receptacle opening when the cap is attached to the glass receptacle, it is to say towards the interior of the cap.

When the cap is attached to the glass cap the sealing ring is compressed between the annular mouth of the glass receptacle and said inner annular protrusion, concentrating most or all the compression force applied to the sealing ring by the cap on said inner annular protrusion, increasing the obtained sealing without increasing the closing and opening force required to open and close the cap, preventing the entrance of food or beverage between the sealing ring and the annular mouth and/or the closing portion of the cap.

The sealing ring is retained between said inner annular protrusion and the inner diameter of the cylindrical segment when the cap is attached to the glass receptacle, preventing an undesired radial movement of the sealing ring, for example due to the suction produced by a vacuum existent within the glass receptacle, or due to an overpressure existent within the glass receptacle during its heating for example for an sterilization process.

Preferably the inner annular protrusion has a height equal to or greater than 60% or preferably 70%, of the thickness of the sealing ring to ensure a proper retention of the sealing ring, specially when the sealing ring is made of a material which softens when heated, such a thermoplastic.

The cylindrical segment of the engagement portion further comprises radial protrusions directed inwards, said radial protrusions being formed by local deformations of the metal sheet. It will be understood that the radial direction and the inward direction are defined in regard to the center of the engagement portion which has a general cylindrical shape which is concentric and surrounds the cylindrical neck of the glass receptacle when the cap is attached to the glass receptacle.

Said radial protrusions can be placed between the closing portion and the engagement configurations of the cap determining a local narrowing of the inner diameter of the cylindrical segment, it is to say a reduction in its inner diameter.

The sealing ring is not adhered to the cap, so it is loose in regard to the cap.

Said sealing ring is bigger than the local narrowing of the inner diameter of the cylindrical segment produced by the radial protrusions, so that its outer region interferes with the radial protrusions retaining the sealing ring within the cap between the closing portion and the radial protrusions preventing its fall from the cap when the cap is unscrewed from the glass receptacle.

This feature allows the sealing ring to be retained within the cap even when the cap is separated from the glass receptacle, but allowing the release of the sealing ring from the cap by elastic deformation of the sealing ring for cleaning or substitution, increasing the reusability of the cap.

The local narrowing has a diameter bigger than the cylindrical outer surface of the cylindrical neck. Because the sealing ring has an outer diameter bigger than the local narrowing, and preferably equal to the inner diameter of the cylindrical segment of the engagement portion, the sealing ring extends far beyond the outer edge of the annular mouth.

Furthermore, when the cap is attached to the glass receptacle in closed position by a threaded coupling as part of the releasable closure mechanism, and the glass receptacle is under vacuum conditions, the proposed configuration makes easier to break the hermetic seal. When the cap is unscrewed from the thread of the glass receptacle the radial protrusions moves upwards pulling up the outer region of the sealing ring, producing the deformation of the sealing ring and facilitating its separation from the annular mouth and the breakage of the hermetic sealing.

According to an additional embodiment, the sealing ring includes an annular portion and a tab portion connected to a connection region of the annular portion, said tab portion projecting in an outwardly radial direction through a passage defined in the cylindrical segment between the closing portion and the radial protrusions.

Preferably, the flat sealing ring includes a deformation enhancer configuration comprising:
- at least one through hole on said tab portion adjacent to the connection region; and/or
- a thickness reduction of said tab portion in an area adjacent to the connection region, in comparison with the thickness of the annular portion; and/or
- a notch in an inner edge of the sealing annular portion coincident with the connection region determining a reduced width of said connection region in comparison with the width of the rest of the sealing annular portion.

The tab portion, which extends radially from the annular portion, produces a local decrease in the deformability of the connection region in comparison with the rest of the annular portion because said tab portion determines a local increase of the flat sealing ring width in the radial direction. This reduced deformability jeopardizes and makes it difficult the airtight sealing breakage when the user pulls the tab portion.

Any of the proposed configurations produces an increase in the deformability of the annular portion in the connection region and in surrounding areas when the tab portion is pulled by the user, because the proposed deformation enhancer configuration reduces the cross section area of the flat sealing ring without endangering the airtight sealing, allowing for an easier release of the vacuum by pulling the tab portion.

When the deformation enhancer configuration is a through hole placed on the tab portion adjacent to the connection region, and preferably in contact or tangent with said connection region, said through hole interrupts the continuity of the material constitutive of the flat sealing ring, therefore increasing its deformability.

When the deformation enhancer configuration is a thickness reduction placed on the tab portion adjacent to the connection region, and preferably in contact or tangent with said connection region, said thickness reduction reduces the mass of material constitutive of the flat sealing ring, therefore increasing its deformability.

According to an additional embodiment of the present invention, said at least one through hole is one through hole placed between two lateral edges of the tab portion, dividing the tab portion in two branches, and preferably it is placed on a half of the tab portion closer to the connection region of the sealing annular portion.

According to that, the tab portion has two halves, one adjacent to the connection region containing the through hole, and one half away from the connection region.

Preferably the through hole is centered, said two branches being symmetric over a radial axis which extends outwards in a radial direction coplanar with the flat sealing ring and perpendicular to the connection region of the annular portion, to ensure a symmetric deformation of the flat sealing ring and preventing undesired stress concentrations.

The minimal width of each branch is at most one and half times the maximal width of the through hole measured in a direction parallel to the junction between the tab portion and the connection region. This relationship ensures a sufficient deformability enhance without producing a breakage risk.

Preferably the through hole is perpendicular to a main surface of the tab portion and is circular to prevent stress concentrations.

If the deformation enhancer configuration includes a notch, said notch will preferably reduce equal or less than one fifth of the width of the connection region, i.e. that the width of the annular portion, where includes said notch, is at least four fifths of the width on the rest of the annular portion.

Preferably said notch does not affect the area of the annular portion of the flat sealing ring compressed between the annular mouth and the perimetral region of the rigid lid.

The flat sealing ring can be made of rubber or silicone.

The thickness reduction of the deformation enhancer configuration can be an elongated groove parallel to the junction between the tab portion and the connection portion.

Said thickness reduction of the deformation enhancer configuration can be also defined on both sides of the tab portion, for example as two symmetric grooves defined on opposed sides of the tab portion.

It is further proposed to also include gripping configurations on the half of the tab portion away from the connection region. Said gripping enhancer configurations include holes, grooves, and/or protrusions on one or both main surfaces of the tab portion. Said gripping enhancer configurations provide an enhanced gripping of the tab portion for pulling.

The gripping enhancer configurations can be included at least on a half of the tab portion away from the connection portion, which is the most accessible part of the tab portion for a user.

The gripping enhancer configurations are, for example, lineal grooves and/or protrusions oriented in a non-radial direction.

The gripping and the deformation enhancer configurations consistent in a local variation in the thickness of the flat sealing ring will be preferably obtained by thermo-forming said flat sealing ring.

It will be understood that radial direction is a direction contained in a plane coplanar with the flat sealing ring when compressed between the rigid receptacle and the rigid lid which extends outwardly from a center of the annular mouth.

According to an alternative embodiment of the present invention, the cap is made of stainless steel, which is a durable material because it does not rust and because it is a hard and resistant which cannot be easily deformed accidentally. Furthermore, the stiffness of the stainless steel reduces the deformations produces on the cap when is attached to the glass receptacle, assuring a better transmission of the compression force from cap to the sealing ring, permitting the application of a greater compression force on said sealing ring achieving an improved sealing.

Said stainless steel cap is preferably unpainted and unvarnished, preventing the contact of the food or beverage contained in the receptacle with potentially hazardous substances presents on varnishes and paints. The unpainted and unvarnished stainless steel is not compatible with adhesives, preventing the adhesion of a sealing ring on it.

Optionally said one or more radial protrusions is one continuous protrusion surrounding the cylindrical segment, producing a better retention of the sealing ring and a uniform deformation of all the outer region thereof. Alternatively, the radial protrusions are multiple discrete protrusions, making easier the insertion and extraction of the sealing ring.

The inner annular protrusion of the closing portion can be:
- a frustoconical surface compressing an inner region of the sealing ring against an inner edge of the annular mouth; or
- a protrusion with a V-shaped section defining a circular edge which compresses an inner region of the sealing ring against the annular mouth or against an inner edge of the annular mouth.

The inner edge of the annular mouth is the circular edge of the annular mouth having the smallest diameter, and the outer edge of the annular mouth is the circular edge of the annular mouth having the biggest diameter. Optionally said inner edge can be flattened producing a frustoconical surface parallel to the frustoconical surface of the inner annular protrusion.

The inner region of the sealing ring is the region thereof closest to the center of the sealing ring, and the outer region is the region thereof farthest from the center of the sealing ring.

Said frustoconical surface is preferably defined as a circular step between two non-coplanar regions of the closure portion. Preferably said frustoconical surface is vertically aligned with or vertically adjacent to the inner edge of the annular mouth when the cap is attached to the glass receptacle. Said inner edge of the annular mouth can be flattened.

Said protrusion having a V-shaped section is defined by an annular deformation of the metal sheet constitutive of the closing portion of the cap, producing an annular groove and one complementary annular protrusion on opposed sides of the closing portion of the cap.

According to an additional embodiment, the closing portion further comprises an outer annular protrusion which is concentric with the cylindrical segment, surrounding the inner annular protrusion, and which protrudes towards the receptacle opening, the sealing ring being compressed between the annular mouth and the outer annular protrusion, preventing the entrance of air between the sealing ring and the annular mouth and/or the closing portion of the cap. Preferably said outer annular protrusion is vertically aligned with or vertically adjacent to the outer edge of the annular mouth.

Said outer annular protrusion can be, for example:
- a frustoconical surface compressing an outer region of the sealing ring against an outer edge of the annular mouth; or
- a protrusion with a V-shaped section defining a circular edge which compresses an outer region of the sealing ring against the annular mouth or against an outer edge of the annular mouth.

Optionally said outer edge can be flattened and can produce a frustoconical surface parallel to the frustoconical surface of the outer annular protrusion.

Preferably the closing portion is in contact with the sealing ring only through the inner annular protrusion or only through the inner and the outer annular protrusions, so that all the compression force applied by the cap to the sealing ring is concentrate on that areas, improving the sealing.

According to one proposed embodiment of the present invention, the closing portion and the engagement portion of the cap are independent to each other, two separated elements. In this case the engagement portion will further comprise a ring mouth segment overlapped to a perimeter area of the closing portion, retaining said closing portion between the ring mouth segment and the sealing ring.

According to that, when the cap is separated from the glass receptacle, the sealing ring is retained within the cap by said radial protrusions directed inwards, and the closing portion is retained within the cap between the sealing ring and the ring mouth segment of the engagement portion.

Preferably the closing portion has an outer diameter equal or smaller than the narrowing of the inner diameter of the cylindrical segment and equal or smaller than the engagement configurations of the cylindrical segment so that, once the sealing ring is removed, the closing portion can be also removed from the cap for cleaning or renovation operations. When said sizes are equal a little pressure can be required to extract said closing portion from the cap.

The closing portion can also include a bumped central area collapsible under a vacuum existent in the interior of the container as a tamper evidence.

According to an additional embodiment, the metal sheet of the engagement portion has a first thickness, and the closing portion is made of a metal sheet with a second thickness smaller than the first thickness, obtaining a stiffer and more durable engagement portion and a closing portion with sufficient flexibility to permit the collapse of the bumped central area under certain predefined vacuum level.

Preferably the first thickness is comprised between 0.3 mm and 0.2 mm and the second thickness is comprised between 0.15 mm and 0.1 mm, and preferably the sealing ring has a thickness comprised between 1.5 mm and 2.5 mm.

Alternatively, the closing portion can be made of a different material than the engagement portion. For example, the closing portion can be made of glass, ceramic, plastic, or can be an open mesh.

According to second aspect, the present invention is directed to an alternative container with a reusable cap, including, as in the prior alternative:
- a glass receptacle provided with a receptacle opening surrounded by a cylindrical neck including retention configurations on a cylindrical outer surface thereof, said cylindrical neck defining an annular mouth surrounding the receptacle opening;
- a cap including a closing portion completely covering the receptacle opening and an engagement portion made of metal sheet and including a cylindrical segment with an inner diameter surrounding the cylindrical neck,
- a releasable closure mechanism connecting the engagement portion with the retention configurations to provide engagement between the cap and the glass receptacle producing a compression force on the closing portion towards the annular mouth when the cap is in an attached position; and
- a sealing ring with an outer diameter equal to or smaller than the inner diameter of the cylindrical segment and compressed between the annular mouth and the closure portion providing a tight seal;
- the cylindrical segment includes one or multiple radial protrusions, directed inwards, defined by local deformations of the metal sheet and placed at a distance from the closing portion, said radial protrusions determining a local narrowing of the inner diameter of the cylindrical segment, the sealing ring being retained within the cap when the cap is in a detached position from the glass receptacle by having an outer diameter bigger than the local narrowing;
- the sealing ring is not adhered to the cap.

But in this case, the closing portion and the engagement portion of the cap are made of a folded single sheet of metal, and the releasable closure mechanism is a shaped metal wire defining a first region configured for being inserted in one or multiple depressions of the cylindrical segment defined in an outer back side of the one or multiple radial protrusions of the cylindrical segment, a second region configured for being attached to the glass receptacle, and a third region connected to the second region and configured for being movable between a first position, in which the third region is connected to the first region under elastic stress, attracting the first region to the annular mouth of the glass receptacle, and a second position in which the third region is free of elastic stress and the first region is spaced apart from the annular mouth of the glass receptacle or is released from the third region.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which:

FIGS. 3a and 3b shows a transversal section of a tight container in an exploded view and in an assembled view according to an alternative embodiment in which the engagement portion and the closing portion are independent parts of the same cap made of a different metal sheets;

DETAILED DESCRIPTION OF AN EMBODIMENT

Figure 1A:
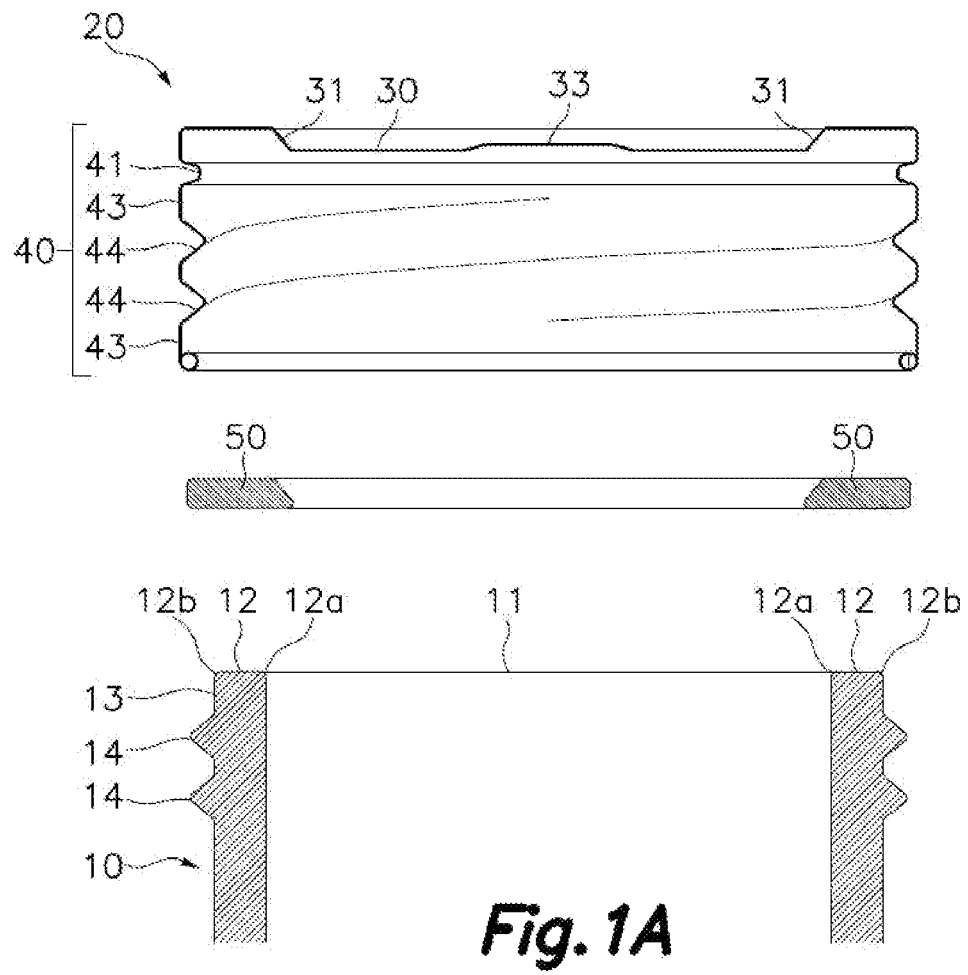
FIGS. 1a and 1b shows a transversal section of a tight container in an exploded view and in an assembled view according to a first embodiment in which the engagement portion and the closing portion are parts of the same cap made of a single metal sheet.
Figure 1B:
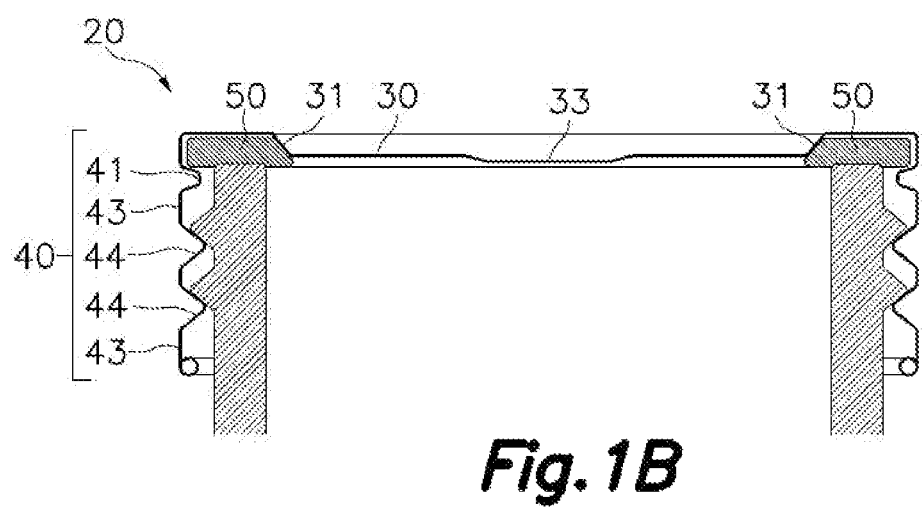
Figure 2A:
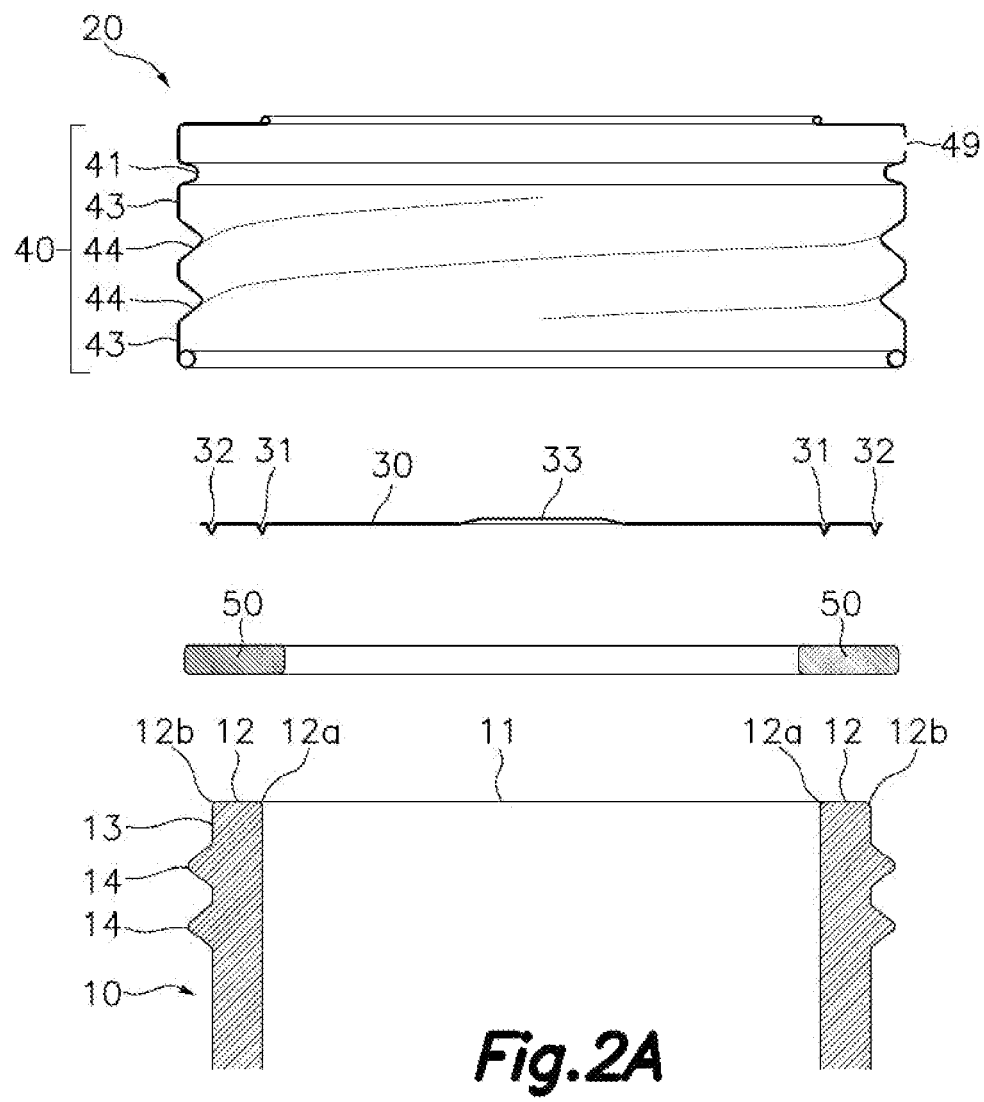
FIGS. 2a and 2b shows a transversal section of a tight container in an exploded view and in an assembled view according to an embodiment in which the engagement portion and the closing portion are independent parts of the same cap made of a different metal sheets.
Figure 2B:
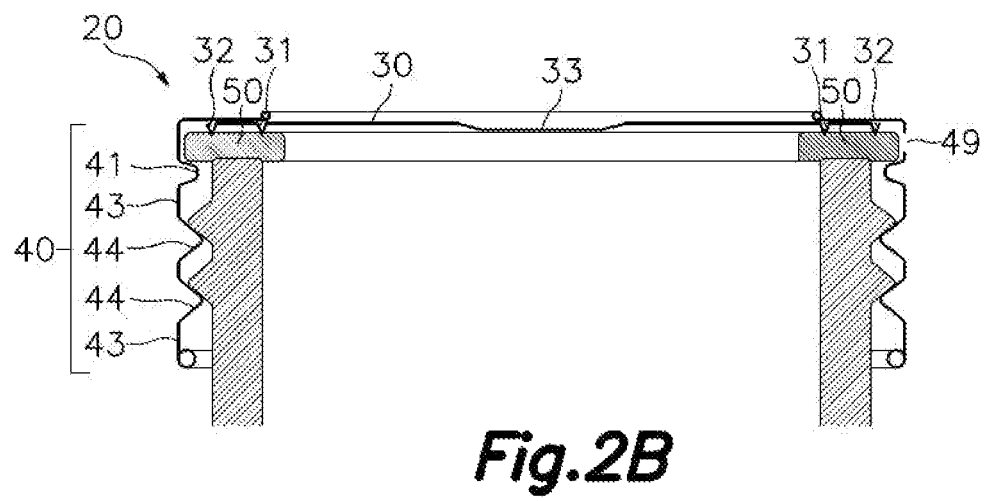

The foregoing and other advantages and features will be more fully understood from the following detailed description of an embodiment with reference to the accompanying drawings, to be taken in an illustrative and not limitative.

The present invention is directed to a vacuum, gas and liquid tight container with a reusable cap 20.

Said container is made of three principal parts: a glass receptacle 10 with a receptacle opening 11, a cap 20 with a closing portion 30 completely covering said receptacle opening 11 and a sealing ring 50 compressed therebetween providing a tight seal.

The glass receptacle 10 further comprises a cylindrical neck 13 including an annular mouth 12 on one end, said cylindrical neck 13 and annular mouth 12 surrounding the receptacle opening 11. The cylindrical neck 13 further comprises a thread 14 on its outer surface.

The cap 20 is made of metal sheet and includes said closing portion 30 and an engagement portion 40 which includes a cylindrical segment 43 with an inner diameter surrounding the cylindrical neck 13. Said cylindrical segment 43 includes engagement configurations 44 defined by local deformations of the metal sheet which are complementary to the thread 14 of the glass receptacle.

Said engagement configurations 44 are protrusions of the cylindrical segment 43 projecting inwards the cap 20 in positions adapted to engage with the thread when the cap 20 is coupled to the glass receptacle 10. Said engagement configurations 44 provide an attachment of the cap 20 to the glass receptacle 10 and generates a compression force which pushes the closing portion 30 towards the annular mouth 12 of the glass receptacle 10, generating a compression force on the sealing ring 50 placed there between.

The sealing ring 50 has an outer diameter equal to or smaller than the inner diameter of the cylindrical segment 43 and is compressed between the annular mouth 12 and the closure portion 30 providing said tight seal.

The cylindrical segment 43 further includes, between the closing portion 30 and the engagement configurations 44, one continuous radial protrusion 41 surrounding all the cylindrical segment 43 and defining a local narrowing on the inner diameter of the cylindrical segment 43.

The sealing ring 50, which is not adhered to the cap 20, has an outer diameter bigger than the local narrowing and equal or smaller than the inner diameter of the cylindrical segment 43, so that said sealing ring 50 can be introduced by elastic deformation into the cap 20, surrounded by the cylindrical segment 43, and retained between the radial protrusion 41 and the coupling portion 30.

In this position the sealing ring 50 is retained in the cap 20 by said radial protrusions 41 even when the cap 20 is separated from the glass receptacle 10, but it can be removed by elastic deformation for cleaning operations.

An additional function of said radial protrusion 41 is to rise the periphery of the sealing ring 50 during the opening of the container, producing the deformation of the sealing ring 50 facilitating the entrance of gases and the breakage of a vacuum existing in the glass receptacle.

According to the first and a third embodiments shown on FIGS. 1*a*, 1*b*, 3*a* and 3*b* the closing portion includes two regions non-coplanar two each other connected through the inner annular protrusion 31 which has a frustoconical shape, the region facing the receptacle opening 11 being at a lower level than the region facing the annular mouth 12.

According to this embodiment, the inner annular protrusion 31 with frustoconical shape faces the inner edge 12*a* of the annular mouth 12, compressing the sealing ring 50 against said inner edge 12*a*.

In an alternative second and fourth embodiments shown on FIGS. 2*a*, 2*b*, 4*a* and 4*b* the closing portion includes two circular concentric grooves defined by two annular deformations of the metal sheet, each of said grooves having an V-shaped cross section and defining an inner annular protrusion 31 and an outer annular protrusion 32 on the side of the closing portion 30 facing the annular mouth 12.

The inner annular protrusion 31 compresses the sealing ring 50 against the inner edge 12*a* of the annular mouth 12, and the outer annular protrusion 32 compresses the sealing ring 50 against the outer edge 12*b* of the annular mouth 12. It will be evident that the outer annular protrusion 32 is optional.

Also, according the embodiments shown on FIGS. 1*a*, 1*b*, 4*a* and 4*b* the cap 20 is made of a single metal sheet defining therein the engagement portion 40 and the closing portion 30.

Figure 4A:
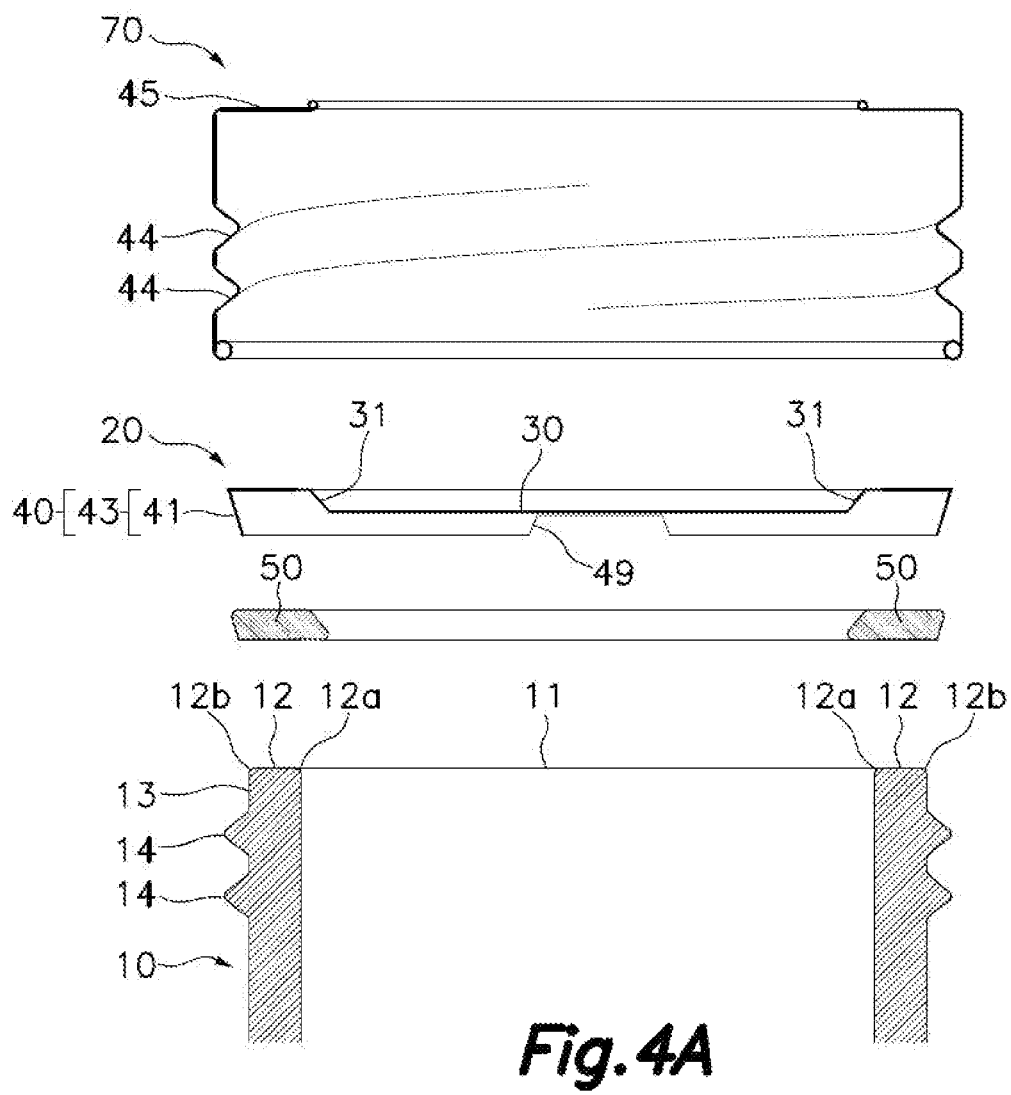
FIGS. 4a and 4b shows a transversal section of a tight container in an exploded view and in an assembled view according to an additional embodiment in which the engagement portion and the closing portion are independent parts of the same cap made of a different metal sheets.
Figure 4B:
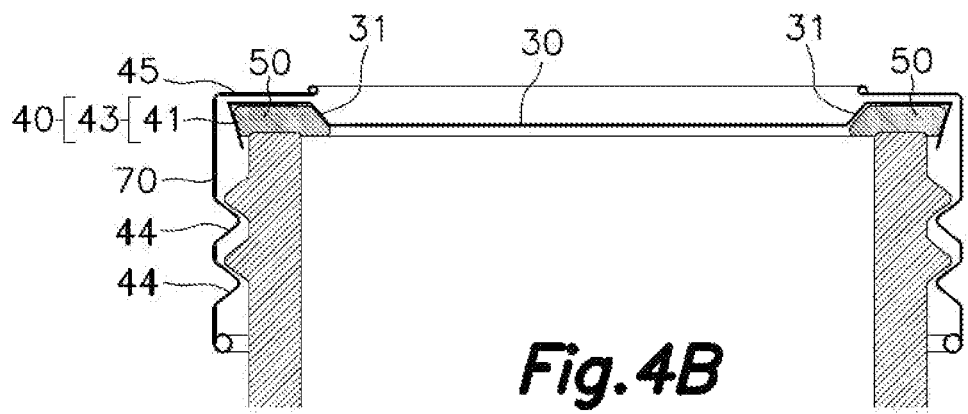

According to the embodiment shown in FIGS. 4*a* and 4*b*, the retention configurations of the cylindrical neck 13 are defined by a thread 14 surrounding said cylindrical neck 13 and wherein the releasable closure mechanism is a threaded ring 70, independent from the cap 20, surrounding the cylindrical segment 43 and including engagement configurations 44 complementary to the thread 14, said threaded ring further including a ring mouth segment 45 overlapped to a perimeter area of the closing portion, retaining said closing portion against the annular mouth of the glass receptacle.

Alternatively, according to the embodiments shown on FIGS. 2*a*, 2*b*, 3*a* and 3*b*, the cap 20 is made of two separated and independent parts, one corresponding to the closing portion 30 and one corresponding to the engagement portion 40, which in this case further comprises a ring mouth segment 45 connected to the cylindrical segment 43 and covering a perimetral region of the closing portion 30 placed above the sealing ring 50. Said ring mouth segment 45 transfers the compression force from the cylindrical segment 43 to the closing portion 30. According to this embodiment the closing portion 30 preferably has an outer diameter equal or smaller than the engagement configurations 44, and equal or smaller than the radial protrusion 41, permitting the extraction of said closing portion 30 from the cap 20 for cleaning operations. The sealing ring 50 retained within the cap 20 by the radial protrusions 41 will also retain said closing portion 30 while in place.

It is also proposed to include, in the closing portion 30, bumped central area 33 collapsible under a vacuum existent in the interior of the container as a tamper evidence. In normal conditions said bumped central area 33 projects outwards from the cap 20, as shown on FIGS. 1*a*, 2*a*, 3*a* and 4*a*, but when the cap 20 is closed and certain amount of vacuum is created within the glass receptacle 20, then the bumped central area 33 collapses and inverts it position to project inwards, as shown on FIGS. 1*b*, 2*b*, 3*b* and 4*b*.

When the closing portion 30 and the engagement portion 40 are separated portions made of different metal sheets, the closing portion 30 can be made of a thinner metal sheet than the engagement portion 40 so that the bumped central area 33 can collapse under a small level of vacuum existent in the interior of the container and at the same time the engagement portion is stiff and does not bend or deform easily.

Figure 5:
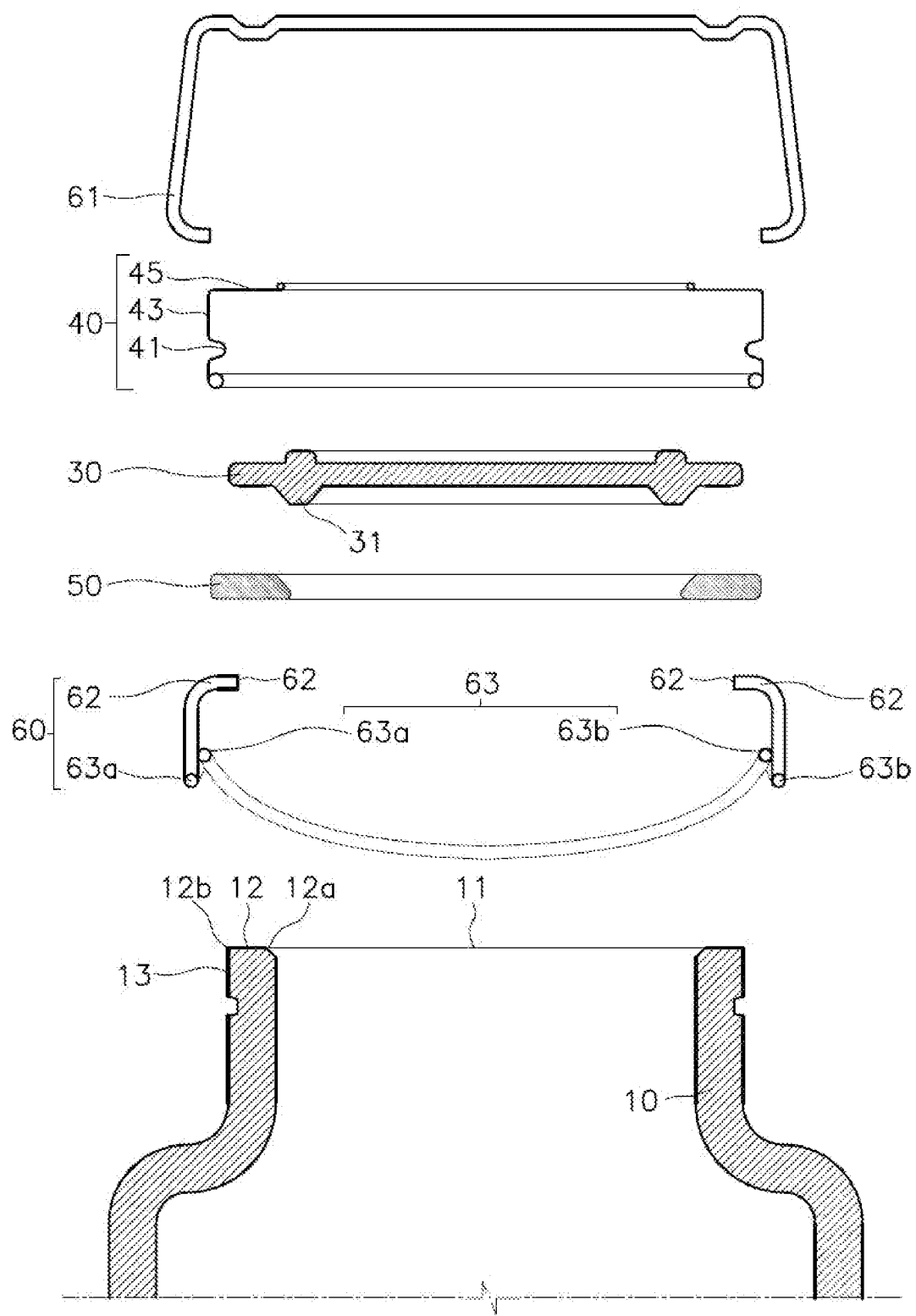
FIG. 5 is an exploded cross-sectional view of a container with a hermetic closure according to a embodiment of the present invention wherein the releasable closure mechanism is made of a metal wire configured to attach the cap to the glass receptacle.
Figure 6:
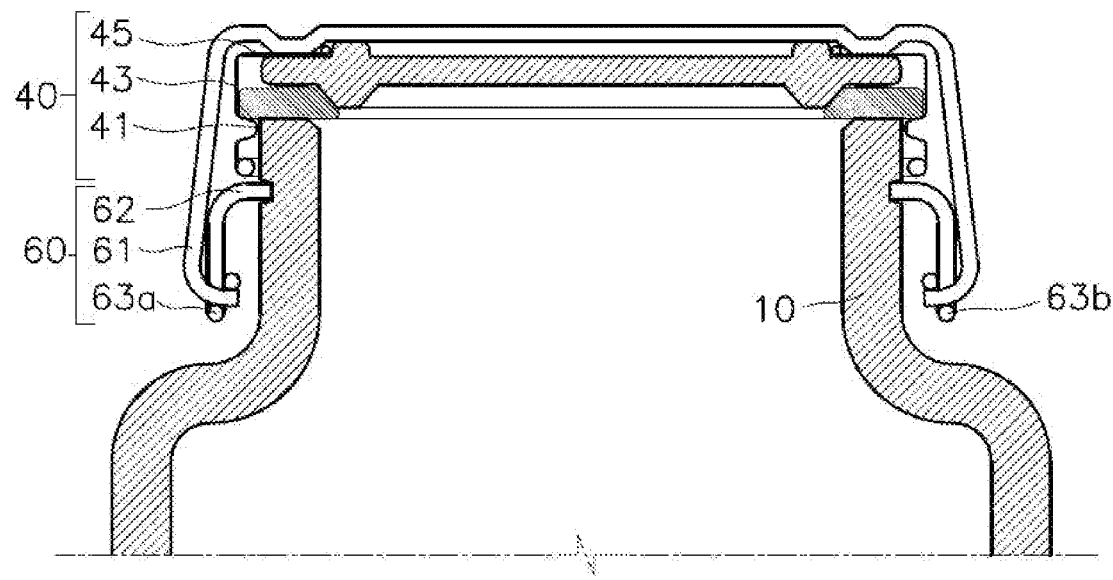
FIG. 6 is a cross-sectional view of the container of FIG. 5 in a closed position.
Figure 7:
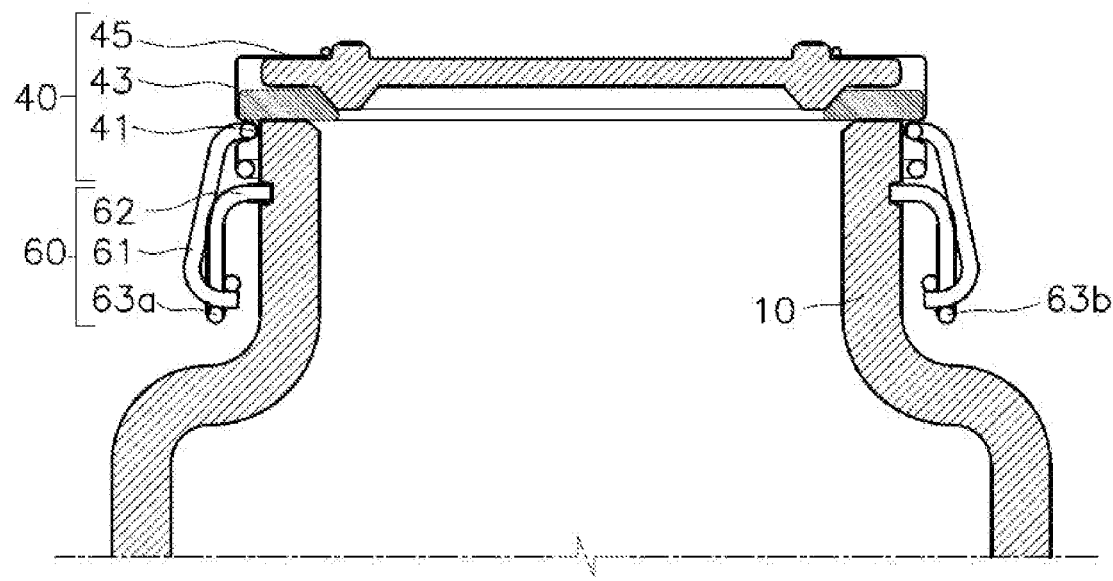
FIG. 7 is a variation of the embodiment shown in FIG. 6 wherein the releasable closure mechanism is attached to a groove defined in the back side of the radial protrusions.

According to an embodiment shown in FIGS. 5, 6, and 7, the closure mechanism consists of a first wire, corresponding to the first region 61, having an inverted U shape with a flat region overlapped to the cap and a second wire, corresponding to the second and third regions 62, 63, having a U shape with a rounded bottom including symmetrical portions 63*a* and 63*b* in the form of loops in areas close to their ends.

The ends of the second wire constitute the second region 62 and are inserted into respective housings arranged on opposite sides of the glass receptacle 10, adjacent to the mouth 11 providing an articulated attachment between the second wire and the receptacle 10. The ends of the first wire are inserted into respective opposite portions 63*a* and 63*b* in the form of loops of the second wire, on opposite sides of the outside of the receptacle 10, providing an articulated attachment between the first wire and the second wire.

The first wire is superimposed on the ring mouth segment 45 of the cap 20 in the closed position, and the second wire allows, according to its position, moving the symmetrical portions 63*a* and 63*b* in the form of loops to which the first wire is articulated in a vertical direction, with the vertical stress of the first wire on the ring mouth segment 45 of the cap 20 being exerted against the mouth 11 of the receptacle 10, assuring hermetic closure thereof.

Alternatively, the first wire is inserted in a groove corresponding to the back side of the radial protrusions.

The first wire constitutes a first region 61 intended for pressing the lid 20 against the receptacle 10, the portions 63*a* and 63*b* of the second wire constitute a third region 63 of the closure mechanism intended for connecting the closure mechanism to the receptacle 10 producing an elastic stress, attracting the first region 61 downwards, and serving as a supporting point for subjecting the second region to elastic stress.

The third region is connected to the glass receptacle 10 in an articulated manner through the second region 62.

The portion of the second wire comprised between the symmetrical portions 63*a* and 63*b* in the form of loops is a lever arm which allows a simultaneous and symmetrical actuation of the two symmetrical portions 63*a* and 63*b*, locating the closure mechanism in the closed or open position in which the lid 20 is released, allowing it to be removed from the mouth 11 of the receptacle 10.

According to another envisaged embodiment the closure mechanism consists of a single shaped wire having an inverted U shape and a flat bottom.

Said metal wire will have a first region 61 in its central area, intended for being attached to the cap 20 as in the examples described before, a third region 63 defined in two portions 63*a* and 63*b* located in areas close to the ends of the wire, intended for being subjected to certain elastic stress when the closure mechanism is in the closed position, and a second region 62 corresponding to the two ends of the wire, said second region being complementary to an annular groove arranged around the mouth 11 of the receptacle 10, provided for fitting said second region 62 therein, and therefore serving as a supporting point so that the third region 63 can provide elastic stress to the first region 61 which transmits it to the lid 20 through two opposite points of the annular closure rib 22.

As shown in FIGS. 2A, 2B, 3A and 3B, the cylindrical segment (43) can include a slit passage 49 between the closing portion 30 and the radial protrusions 41, facing a side edge of the sealing ring 50, or at least partially included in said radial protrusion 41, for example when said radial protrusion is a tapered surface as shown in FIGS. 4a and 4b. Through said slit passage a flat tool, such a round knife, can be inserted for pushing the sealing ring 50 inwards, breaking the vacuum.

As shown in FIGS. 3A, 3B, 9, 10 and 11, the flat sealing ring 50 further comprises a tab portion 53 extending outwards from the annular portion 51, away from said central opening, through the slit passage 49. Said tab portion 53 is accessible from the exterior of the container by a user for pulling the flat sealing ring 50 outwards in a radial direction coplanar with said flat sealing ring 50 for breaking the vacuum defined within the container.

The region of the annular portion 51 wherein the tab portion 53 is attached is named connection region 52.

To improve the deformability of the annular portion 51 in the region coincident or adjacent to the connection region 52 it is proposed to include a deformation enhancer configuration to said flat sealing ring 50.

Figure 9:
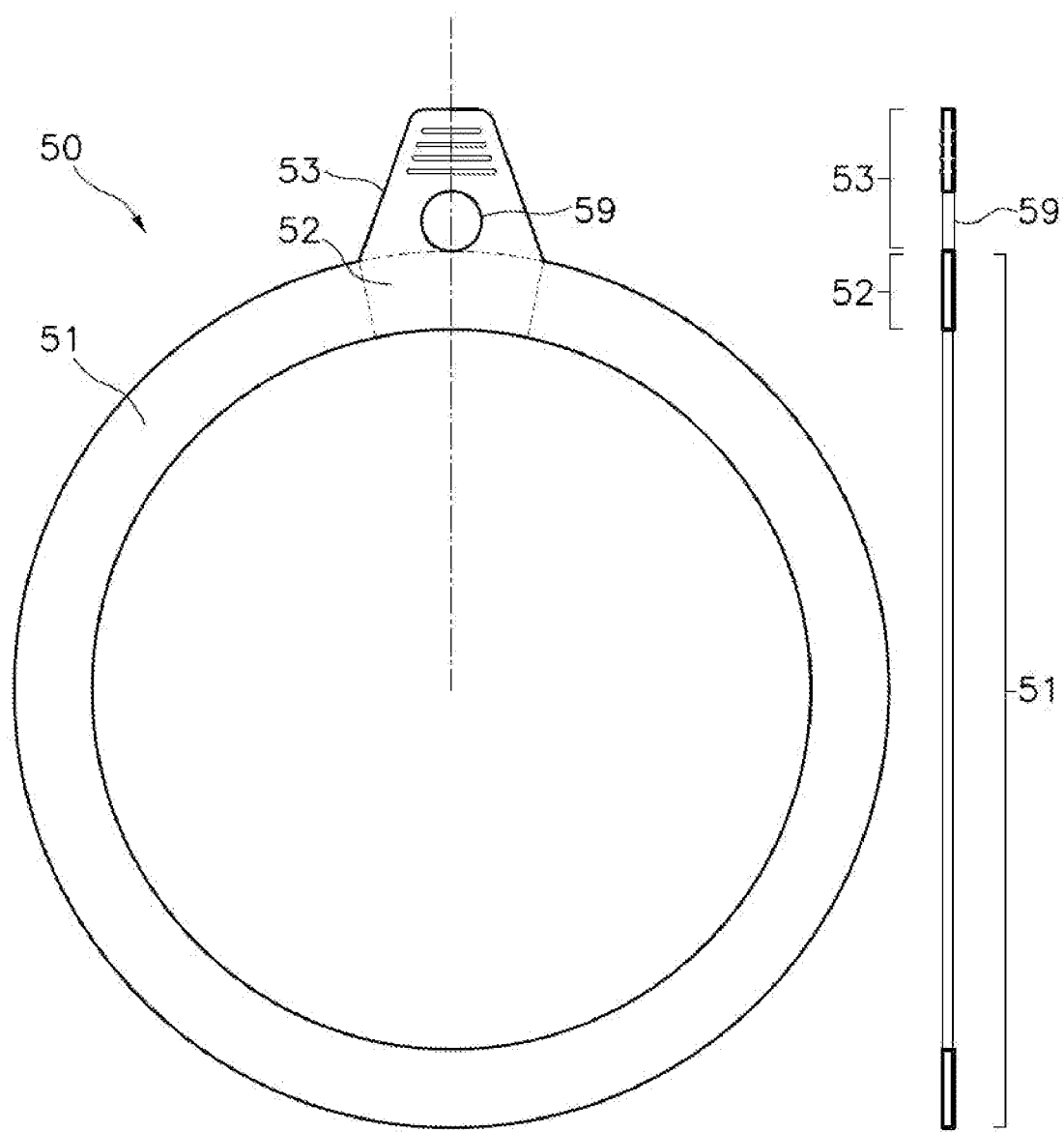
FIG. 9 shows a plan view and a cross section view of the flat sealing ring according to a first embodiment of the present invention in which the deformation enhancer configuration is a circular through hole.

According to a first embodiment shown on FIG. 9, the proposed deformation enhancer configuration 59 comprises a circular through hole adjacent to the connection region 52.

Preferably said through hole is fully comprised in the half of the tab portion 53 closer to the connection region 52.

Said through hole divide the tab portion 53 in two symmetric branches. Preferably the minimal width of each branch is equal to or smaller than the maximal width of the through hole. It is also preferred that each branch has a minimal width equal to or bigger than two times its thickness.

Figure 10:
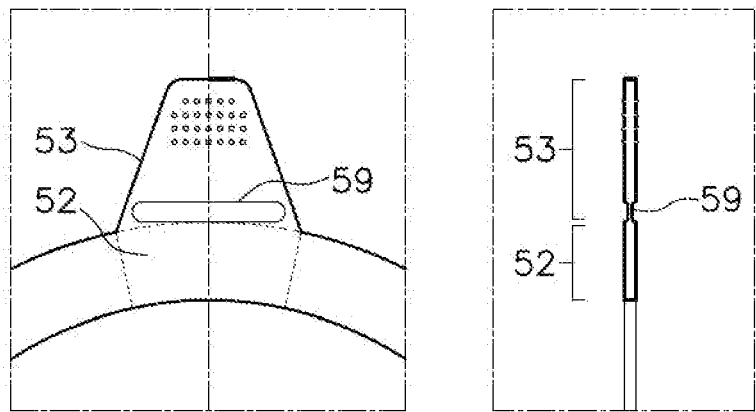
FIG. 10 shows a plan view and a cross section view of a region of the flat sealing ring containing said tab portion according to a second embodiment in which the deformation enhancer configuration is a linear groove on the surface of the tab portion defining a thickness reduction thereof.

According to an alternative embodiment shown on FIG. 10, the deformation enhancer configuration 59 is a linear groove contained in the tab portion 53 and adjacent to the connection region 52, producing a thickness reduction of the tab portion 53 in comparison with the thickness of the annular portion 51.

In this embodiment said groove is perpendicular to the radial direction, but the thickness reduction can have many other shapes or even affect the entire surface of the tab portion 53.

Figure 11:
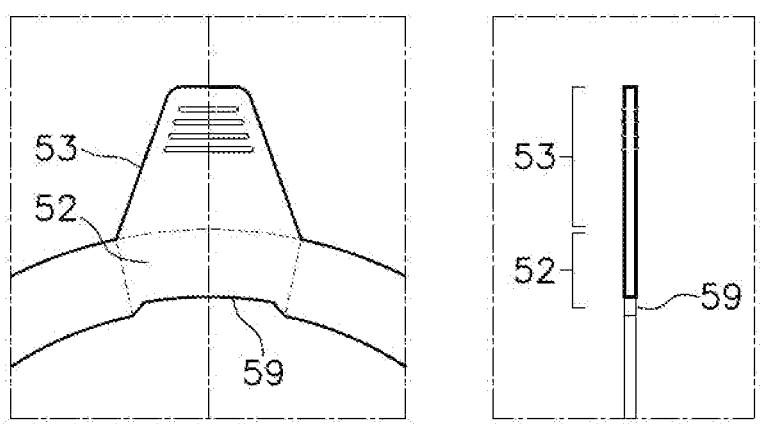
FIG. 11 shows a plan view and a cross section view of a region of the flat sealing ring containing said tab portion according to a third embodiment in which the deformation enhancer configuration is a notch in the inner side of the connection region of the annular portion defining a width reduction thereof on that connection region.

According to a third embodiment of the present invention, shown on FIG. 11, the deformation enhancer configuration 59 is a notch of the inner edge of the annular portion 51 which surrounds the central opening. Said notch produces a width reduction of the annular portion 51 coincident with the connection region 52. The dimension of said notch shall be limited to prevent the reduction of the sealing capacity of the flat sealing ring 50. In this case the notch reduces one fifth of the width of the annular portion 52.

Figure 8A:
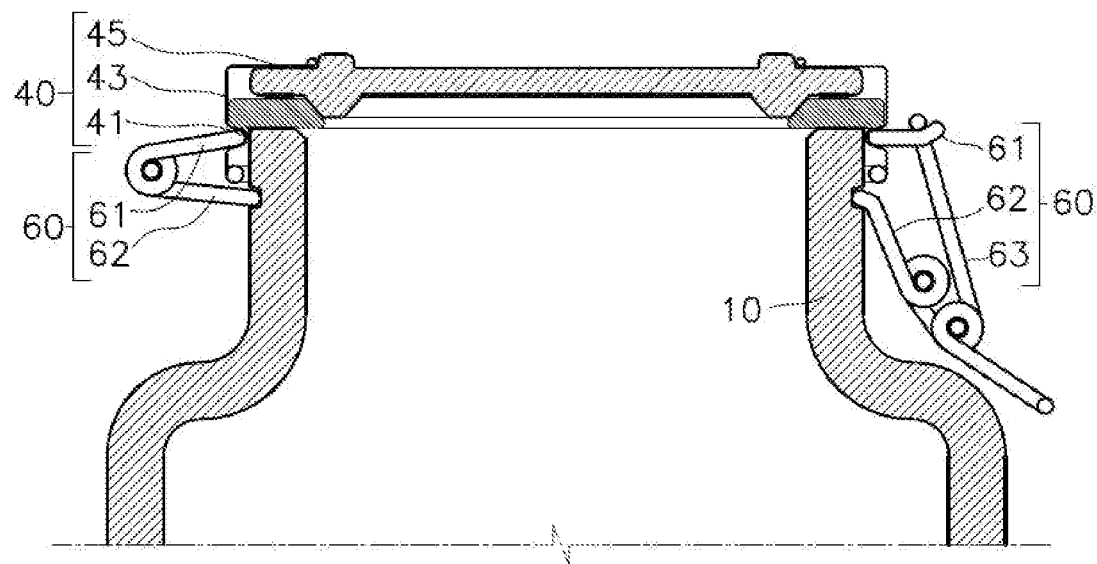
FIGS. 8A and 8B are a variation of the embodiment shown in FIG. 6 wherein the releasable closure mechanism is attached to a groove defined in the back side of the radial protrusions and wherein the first region and the second region of the releasable closure mechanism are connected in an articulated manner on one side of the cylindrical neck and connected in a releasable manner on the opposed side of the cylindrical neck through the third region.
Figure 8B:
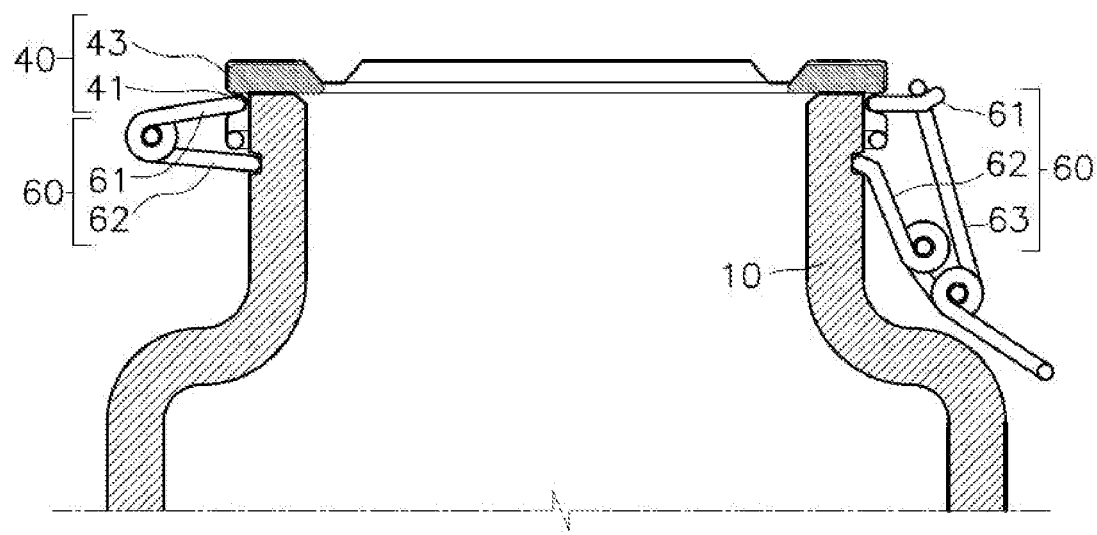

The present invention also proposes the inclusion of a gripping enhancer configuration comprised at least in the half of the tab portion 53 away from the connection region 52. In the embodiments shown on FIGS. 8, 9 and 10 said gripping enhancer configuration comprises linear protrusions or dot-shaped protrusions, but also depressions or holes are also contemplated.

It will be understood that various parts of one embodiment of the invention can be freely combined with parts described in other embodiments, even being said combination not explicitly described, provided there is no harm in such combination.

The invention claimed is:

1. A container with a reusable cap, including:
a glass receptacle provided with a receptacle opening surrounded by a cylindrical neck including retention configurations on a cylindrical outer surface thereof, said cylindrical neck including an annular mouth surrounding the receptacle opening;
a cap including a closing portion completely covering the receptacle opening and an engagement portion made of metal sheet and including a cylindrical segment with an inner diameter;
a releasable closure mechanism integrated in or connected to the engagement portion of the cap and configured to connect the engagement portion with the retention configurations of the glass receptacle to provide engagement between the cap and the glass receptacle producing a compression force on the closing portion of the cap towards the annular mouth when the cap is in an attached position; and
a sealing ring with an outer diameter equal to or smaller than the inner diameter of the cylindrical segment and compressed between the annular mouth and the closure portion providing a tight seal;
the cylindrical segment includes one or multiple radial protrusions, directed inwards, defined by local deformations of the metal sheet and placed at a distance from the closing portion, said radial protrusions determining a local narrowing of the inner diameter of the cylindrical segment to a diameter smaller than an outer diameter of the sealing ring, the radial protrusions being separated from the closing portion a gap distance in an axial direction, said gap distance containing the entire thickness of the sealing ring interposed between the radial protrusions and the closing portion, the radial protrusions being in contact with the sealing ring in the axial direction when the cap is in a detached position from the glass receptacle, thereby retaining the sealing ring between the radial protrusions and the closing portion;
the sealing ring is not adhered to the cap;
the engagement portion, or a portion of the engagement portion excluding the cylindrical segment, is independent from the closing portion and further comprises a ring mouth segment overlapped to a perimeter area of the closing portion, retaining said closing portion between the ring mouth segment and the sealing ring.

2. The container according to claim 1 wherein the closing portion is made of a metal sheet or is made of a metal sheet and includes a bumped central area collapsible under a vacuum existent in the interior of the container as a tamper evidence.

3. The container according to claim 2 wherein the metal sheet of the engagement portion has a first thickness and the metal sheet of the closing portion has a second thickness smaller than the first thickness, or the metal sheet of the engagement portion has a first thickness comprised between 0.3 mm and 0.2 mm, and the metal sheet of the closing portion has a second thickness comprised between 0.15 mm and 0.1 mm.

4. The container according to claim 1 wherein the closing portion has an outer diameter equal to or smaller than the diameter of the cylindrical segment at the local narrowing.

5. The container according to claim 1 wherein the retention configurations of the cylindrical neck are defined by a thread surrounding said cylindrical neck and wherein the releasable closure mechanism is defined by engagement configurations defined by local deformations or folds of the metal sheet constitutive of the cylindrical segment, the engagement configurations being complementary to the thread.

6. The container according to claim 1 wherein the releasable closure mechanism is a shaped metal wire defining:
   a first region configured for being connected to the cap, at least when in the closed position;
   a second region configured for being attached to the glass receptacle, at least when in the closed position;
   a third region connected to the second region and configured for being movable between a first position, in which the third region is connected to the first region under elastic stress, attracting the first region to the annular mouth of the glass receptacle, and a second position in which the third region is free of elastic stress releasing or loosing the first region, allowing the separation of the first region from the annular mouth of the glass receptacle.

7. The container according to claim 6 wherein the first region is inserted in one or multiple depressions of the cylindrical segment defined in an outer back side of the one or multiple radial protrusions of the cylindrical segment.

8. The container according to claim 6 wherein the first region and the second region are connected to each other in an articulated manner in a first side of the cylindrical neck of the glass receptacle, and the third region is connected in an articulated manner to the second region in a second side of the cylindrical neck opposed to the first side, the connection between the first and third regions being configured to be releasable when in the open position.

9. The container according to claim 6 wherein the second region and the third region are connected to each other, and the first region is connected to the third region in an articulated manner, being configured to remain connected to the third region in both the closed and the open positions.

10. The container according to claim 1 wherein the releasable closure mechanism comprises several clip members each connecting, under elastic stress, the retention configurations of the cylindrical neck with the cap when the cap is in closed position.

11. The container according to claim 1 wherein said one or more radial protrusions is one continuous protrusion surrounding the cylindrical segment of the engagement portion.

12. The container according to claim 1 wherein the one or multiple radial protrusions of the cylindrical segment are one or multiple tapered surfaces determining an inner diameter of the cap cylindrical segment that increases as the distance from the closing portion decreases, retaining the sealing ring therein.

13. The container according to claim 1 wherein the closing portion includes an inner annular protrusion or an inner annular protrusion and an outer annular protrusion, the inner annular protrusion is concentric with the cylindrical segment and protrudes towards the receptacle opening, and the outer annular protrusion is concentric with the cylindrical segment, surrounds the inner annular protrusion and protrudes towards the receptacle opening, the sealing ring being compressed between the annular mouth and the inner annular protrusion or between the annular mouth and the inner and outer annular protrusions and being retained in a centered position between said inner annular protrusion and the inner diameter of the cylindrical segment.

14. The container according to claim 13 wherein the inner annular protrusion of the closing portion is:
   a frustoconical surface compressing an inner region of the sealing ring against an inner edge of the annular mouth; or
   a protrusion with a V-shaped section defining a circular edge which compresses an inner region of the sealing ring against the annular mouth or against an inner edge of the annular mouth.

15. The container according to claim 13 wherein said outer annular protrusion is:
   a frustoconical surface compressing an outer region of the sealing ring against an outer edge of the annular mouth; or
   a protrusion with a V-shaped section defining a circular edge which compresses an outer region of the sealing ring against the annular mouth or against an outer edge of the annular mouth.

16. The container according to claim 13, wherein the closing portion is in contact with the sealing ring only through the inner annular protrusion or only through the inner and the outer annular protrusions.

17. The container according to claim 1 wherein the portions of the cap made of a metal sheet are made of unpainted and unvarnished sheet of stainless steel.

18. The container according to claim 1 wherein the cylindrical segment includes a slit passage between the closing portion and the radial protrusions, facing a side edge of the sealing ring.

19. The container according to claim 18 wherein the sealing ring includes an annular portion and a tab portion connected to a connection region of the annular portion, said tab portion projecting in an outwardly radial direction through said slit passage defined in the cylindrical segment.

20. The container according to claim 19 wherein the sealing ring includes a deformation enhancer configuration comprising:
   at least one through hole on said tab portion adjacent to the connection region; and/or
   a thickness reduction of said tab portion in an area adjacent to the connection region, in comparison with the thickness of the annular portion; and/or
   a notch in an inner edge of the sealing annular portion coincident with the connection region determining a reduced width of said connection region in comparison with the width of the rest of the sealing annular portion.

* * * * *